US011024244B2

(12) United States Patent
Qiu

(10) Patent No.: US 11,024,244 B2
(45) Date of Patent: Jun. 1, 2021

(54) DISPLAY DEVICE AND DRIVING METHOD THEREOF

(71) Applicants: HKC CORPORATION LIMITED, Shenzhen (CN); CHONGQING HKC OPTOELECTRONICS TECHNOLOGY CO.,LTD., Chongqing (CN)

(72) Inventor: Bin Qiu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/042,209

(22) PCT Filed: Dec. 12, 2018

(86) PCT No.: PCT/CN2018/120582
§ 371 (c)(1),
(2) Date: Sep. 28, 2020

(87) PCT Pub. No.: WO2019/184453
PCT Pub. Date: Oct. 3, 2019

(65) Prior Publication Data

US 2021/0020133 A1 Jan. 21, 2021

(30) Foreign Application Priority Data

Mar. 28, 2018 (CN) ......................... 201810266840.0

(51) Int. Cl.
*G06F 1/00* (2006.01)
*G09G 3/36* (2006.01)
(Continued)

(52) U.S. Cl.
CPC ......... *G09G 3/3666* (2013.01); *G09G 3/3266* (2013.01); *G09G 3/3275* (2013.01); *G09G 2310/0221* (2013.01); *G09G 2310/08* (2013.01)

(58) Field of Classification Search
None
See application file for complete search history.

(56) References Cited

U.S. PATENT DOCUMENTS

2016/0055801 A1 2/2016 Kim et al.
2017/0098431 A1* 4/2017 Oh ....................... G09G 3/2096
2018/0182278 A1* 6/2018 Kim ..................... G09G 3/2018

FOREIGN PATENT DOCUMENTS

CN 101447156 A 6/2009
CN 203351179 U 12/2013
(Continued)

*Primary Examiner* — Michael A Faragalla
(74) *Attorney, Agent, or Firm* — Bayramoglu Law Offices LLC

(57) ABSTRACT

A display device includes a display panel, a first drive circuit, a second drive circuit, a plurality of timing control circuits, and a signal transmission circuit. The first timing control circuit and the second timing control circuit respectively transmit a plurality of data signals to the first drive circuit according to the obtained plurality of display data, and the first drive circuit respectively controls potentials of the first data line group and the second data line group according to the plurality of data signals.

16 Claims, 8 Drawing Sheets

1081

(51) Int. Cl.

| | |
|---|---|
| ***G09G 3/3266*** | (2016.01) |
| ***G09G 3/3275*** | (2016.01) |

(56) References Cited

FOREIGN PATENT DOCUMENTS

| | | | |
|---|---|---|---|
| CN | 105554423 | A | 5/2016 |
| CN | 107742504 | A | 2/2018 |
| CN | 108320694 | A | 7/2018 |
| KR | 20140123625 | A | 10/2014 |

* cited by examiner

DISPLAY DEVICE AND DRIVING METHOD THEREOF

CROSS REFERENCE TO THE RELATED APPLICATIONS

This application is the national phase entry of International Application No. PCT/CN2018/120582, filed on Dec. 12, 2018, which is based upon and claims priority to Chinese Patent Application No. 201810266840.0, filed on Mar. 28, 2018, the entire contents of which are incorporated herein by reference.

TECHNICAL FIELD

The present application relates to the technical field of display technology, and more particularly to a display device and a driving method thereof.

BACKGROUND

The statements provided herein are merely background information related to the present application, and do not necessarily constitute any prior arts. When a thin film transistor-liquid crystal display (TFT-LCD) displays normally, it requires a gate driver, a source driver, with a combination of criss-crossing scanning lines (Gate line) and data lines on the substrate to control each pixel thereby achieving a display of images.

A mode for driving a display includes: a color (for example: R/G/B) compression signal, a control signal and a power supply are transmitted to the control board via a system mainboard. After being processed by a timing controller (TCON) on the control board, the signals are transmitted to the source circuit and the gate circuit of the printed circuit board, and with the scanning lines, the data lines, the power supply and the other lines on the substrate, necessary data and power are transmitted to the display area, such that the display can obtain the power and signals required for displaying the images.

With the continuous improvement of requirements for resolution of display, 4K2K resolution of display can no longer meet people's pursuit of ultra-high definition images, and the subsequent 8K4K resolution of display gradually enters people's vision. There are two main methods to realize 8K4K display technology: (1) using a 8K4K timing control circuit to directly achieve 8K4K display effects. However, the development cost of related chips and integrated circuits (IC) is relatively high; (2) Using two 4K2K timing control circuits, the 4K2K image control signal is converted into 4K4K image control signal through a data processing, and then being input to the left and right half of the screen display area to complete the 8K4K display. However, this requires the timing control circuit to possess a function of data expansion, that is, to limit specifications and components of the timing control circuit.

SUMMARY

An object of the present application is to provide a display device, including but not limited to solving a technical problem that 4K2K resolution of display can no longer satisfy people's pursuit of ultra-high-definition images.

In order to solve the aforesaid technical problem, a technical solution to be used by the embodiments of the present application is as follows:

A display device, which includes:

a display panel having a display area and a peripheral wiring area, where the display area is provided with a plurality of scanning lines, a plurality of data lines, a plurality of active switches, and a plurality of pixels, where the plurality of pixels are coupled to the plurality of active switches, respectively, and the plurality of active switches are electrically coupled between the plurality of scanning lines and the plurality of data lines, respectively;

a first drive circuit connected with the plurality of data lines, and the plurality of data lines defining a first data line group and a second data line group;

a second drive circuit connected with the plurality of scanning lines, and the plurality of scanning lines defining a plurality of scanning line groups;

a plurality of timing control circuits connected with the first drive circuit, and the plurality of timing control circuits includes a first timing control circuit and a second timing control circuit;

a signal transmission circuit configured to divide screen data into a plurality of display data according to display positions, and transmit the plurality of display data to the corresponding plurality of timing control circuits, respectively;

among them, the first timing control circuit is connected with the second drive circuit, and the first timing control circuit is configured to provide a plurality of gate activation signals, where the plurality of gate activation signals are corresponding to the plurality of scanning line groups, the second drive circuit is configured to control scans of the plurality of scanning line groups according to the plurality of gate activation signals;

the first timing control circuit and the second timing control circuit are configured to convert the plurality of display data into corresponding plurality of data signals, and send the plurality of data signals to the first drive circuit, where the first drive circuit is configured to adjust potentials of the first data line group and the second data line group according to the plurality of data signals.

Another object of the present application is to provide a driving method of a display device, which includes:

providing a first gate activation signal to a first scan circuit and a second scan circuit in the same period through a first timing control circuit and a second timing control circuit, respectively;

controlling a first line segment of a first scanning line group through the first scan circuit according to the first gate activation signal, and controlling a second line segment of the first scanning line group through the second scan circuit according to the first gate activation signal;

providing a second gate activation signal to the first scan circuit and the second scan circuit in the same period through the first timing control circuit and the second timing control circuit, respectively;

controlling a first line segment of a second scanning line group through the second scan circuit according to the second gate activation signal, and controlling a second line segment of the second scanning line group according to the second gate activation signal;

among them, the first timing control circuit is configured to sequentially provide the first gate activation signal and the second gate activation signal to the first scan circuit, and the second timing control circuit is configured to sequentially provide the first gate activation signal and the second gate activation signal to the second scan circuit.

The display device and the driving method thereof in accordance with the embodiments of the present application, through the division of labor for screen data transmission and the alternate switching control of scanning lines through the plurality of timing control circuits can better achieve the benefits of low-spec timing components controlling high-spec display panels. Since there is no need to adjust the manufacturing process significantly, the original process requirements and product cost can be maintained.

BRIEF DESCRIPTION OF THE DRAWINGS

In order to explain the technical solution of embodiments of the present application more clearly, a brief introduction regarding the accompanying drawings that need to be used for describing the embodiments is given below; Obviously, the drawings in the following description are merely some embodiments of the present application, and for ordinarily skilled one in the art, other drawings can also be obtained according to the current drawings on the premise of paying no creative labor.

DETAILED DESCRIPTION OF THE EMBODIMENTS

Figure 1A:
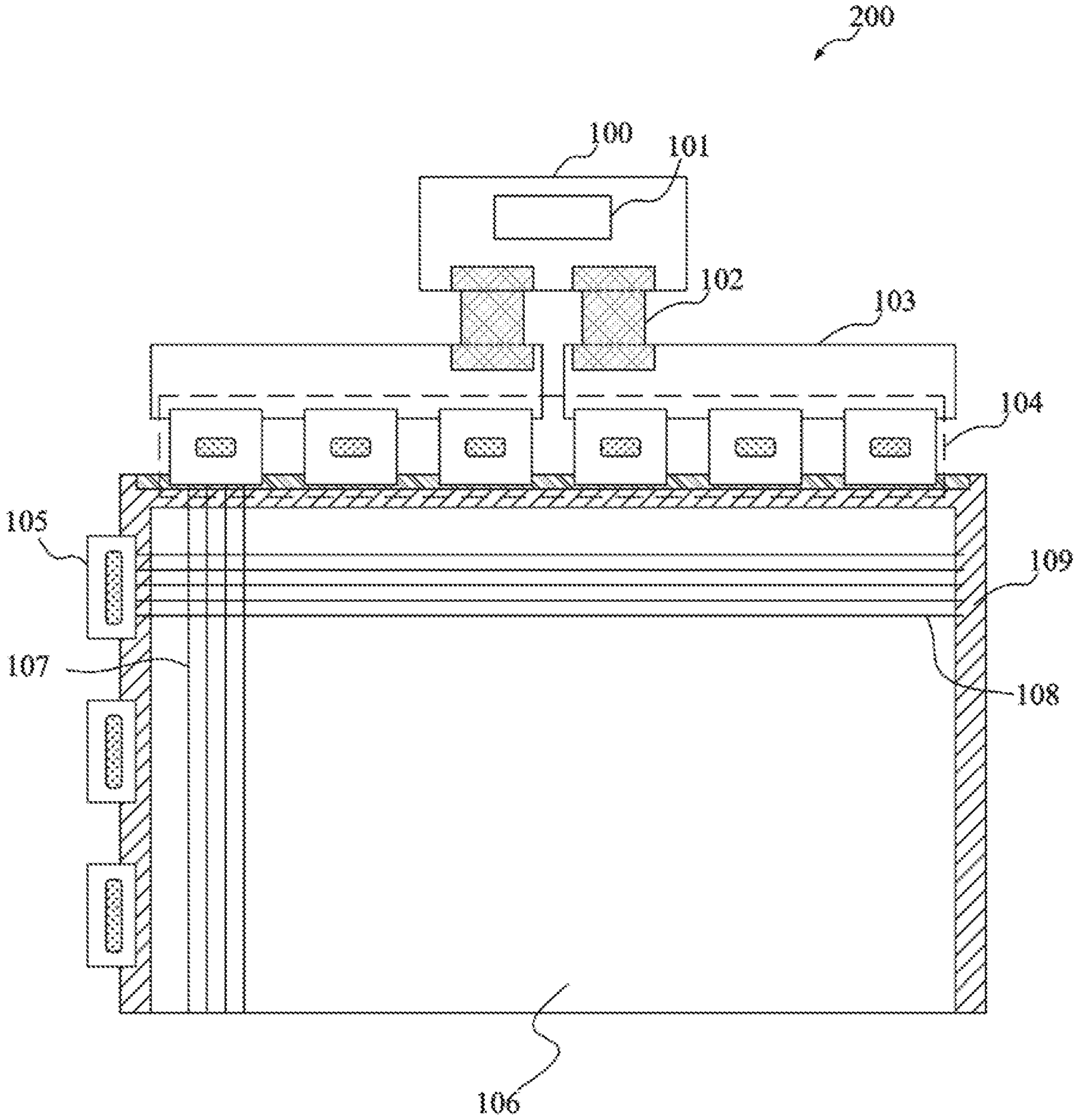
FIG. 1*a* is a schematic structural diagram of a display device in accordance with an embodiment of the present application.

In order to make the objectives, technical solutions and advantages of the present application more comprehensible, the following further describes the present application in detail with reference to the accompanying drawings and embodiments. It should be understood that the specific embodiments described herein are merely used to explain the present application, and are not intended to limit the present application.

It should be noted that when a component is referred to as being "fixed to" or "arranged/provided on" another component, it can be directly or indirectly on the other component. When a component is referred to as being "connected to/with" another component, it can be directly or indirectly connected to the other component. The terms "upper", "lower", "left", "right", etc. indicate the orientation or positional relationship based on the orientation or positional relationship shown in the drawings, and are merely for ease of description, and do not indicate or imply the device or the element referred to must have a specific orientation, be constructed and operated in a specific orientation, and therefore cannot be understood as limitations of the present application. For those of ordinary skill in the art, the specific meaning of the above terms can be understood according to specific conditions. The terms "first" and "second" are merely used for ease of description, and cannot be understood as indicating or implying relative importance or implicitly indicating the number of technical features. The meaning of "a plurality" means two or more than two, unless otherwise specifically defined.

FIG. 1*a* is a schematic structural diagram of a display device in accordance with an embodiment of the present application.

Referring to FIG. 1*a*, a display device 200 includes: a control board 100 which includes a timing circuit (Timing Controller, TCON) 101; a printed circuit board 103 connected with the control board 100 through a flexible flat cable (FFC) 102; and a first drive circuit 104 and a second drive circuit 105 which are disposed in a wiring area 109 and are respectively connected with data lines 107 and scanning lines 108 in a display area 106.

In an embodiment, the second drive circuit 105 and the first drive circuit 104 include but are not limited to a form of a chip-on-film.

A mode for driving a display device 200 includes: a system mainboard provides color (for example: R/G/B) compression signals, control signals and power transmission to the control board 100. After being processed by a timing controller (TCON) 101 on the control board 100, these signals together with the power source processed by the drive circuit, are transmitted to the second drive circuit 105 and the first drive circuit 104 of the printed circuit board 103 through a flexible flat cable (FFC) 102, the necessary data and power are transmitted to the display area 106 via the second drive circuit 105 and the first drive circuit 104, so that the display device 200 can obtain the power and signals required for displaying images.

Figure 1B:
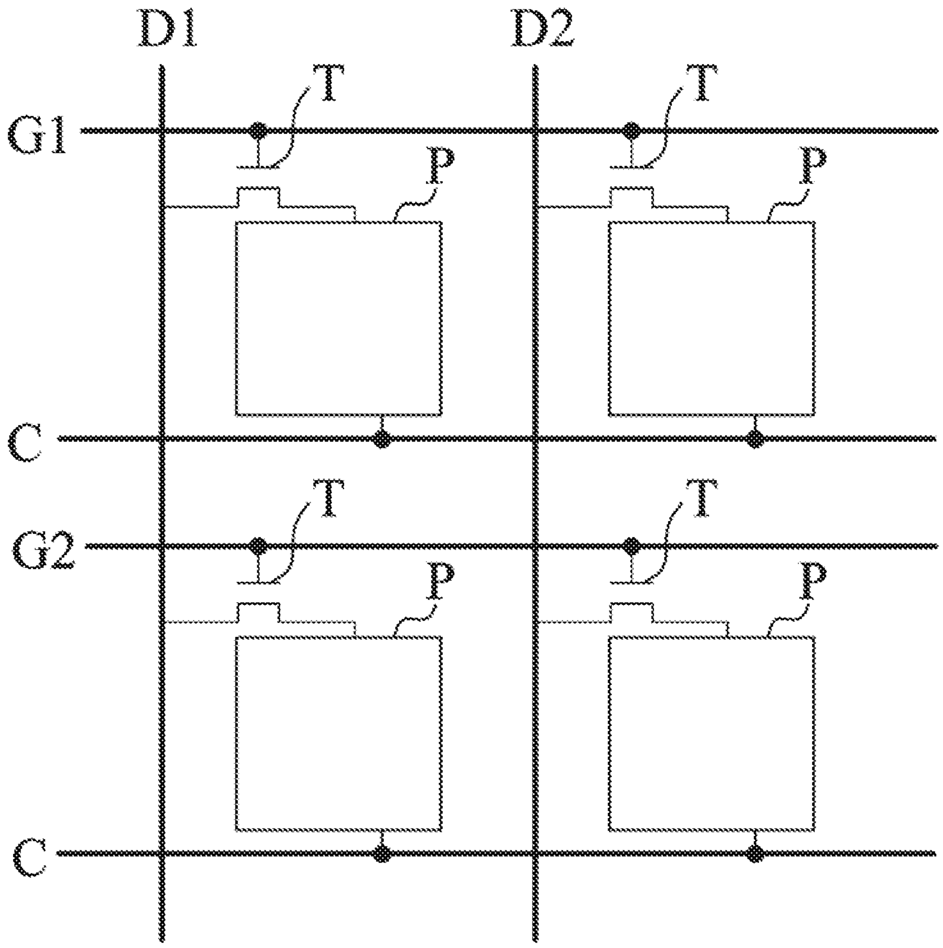
FIG. 1*b* is a schematic diagram of a pixel configuration in accordance with an embodiment of the present application.

FIG. 1*b* is a schematic diagram of a pixel configuration in accordance with an embodiment of the present application.

To facilitate understanding please also refer to FIG. 1*a*. The second drive circuit 105 provides scan signals to the scanning lines 105*a* row by row, and provides scan signals to one row of scanning lines 108 in each scan period. The data lines 107 of the display panel may be opened row by row, and the first drive circuit 104 provides data to the pixel P through the data lines 107.

Figure 1C:
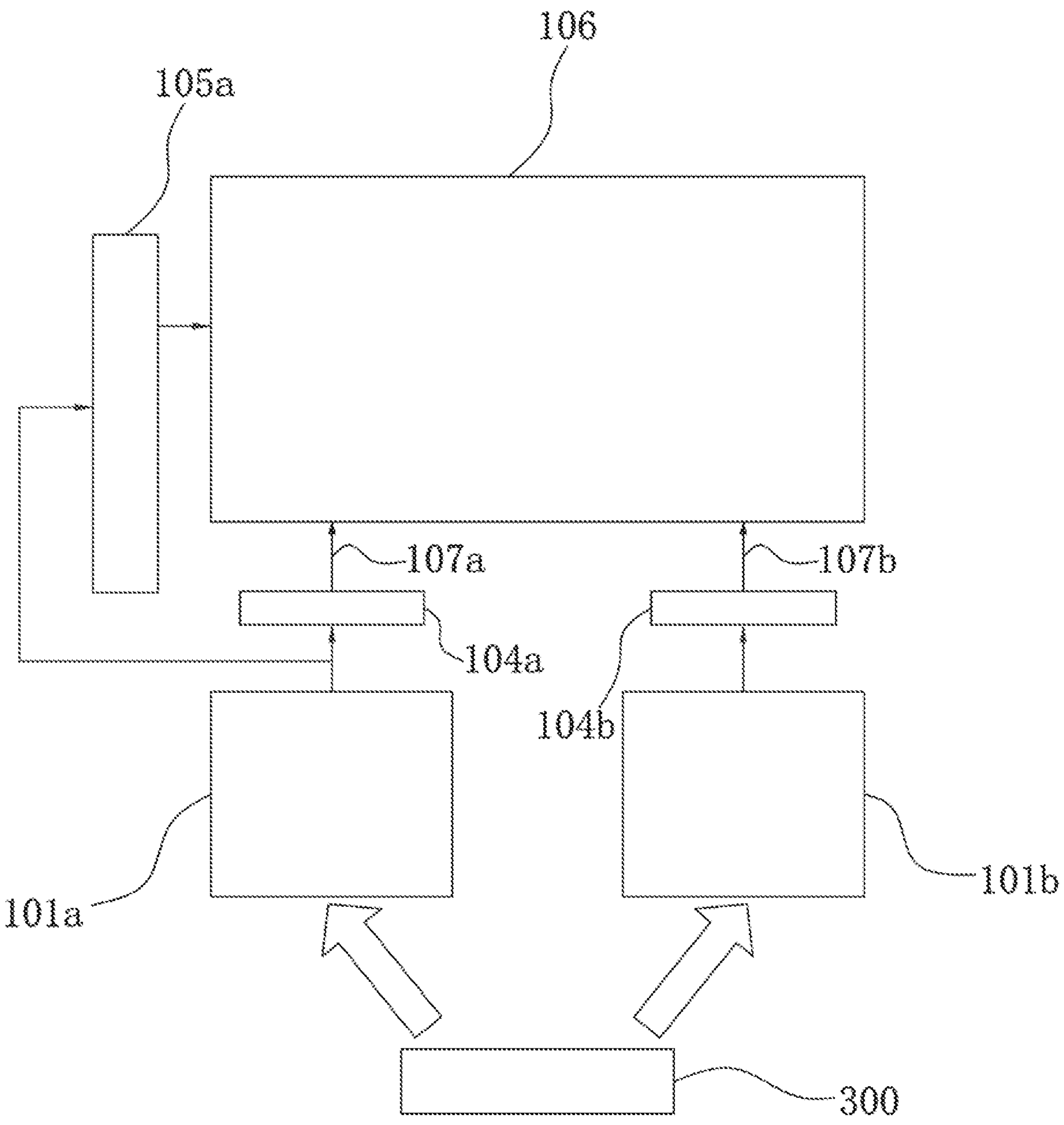
FIG. 1*c* is a schematic structural diagram of a low-spec timing control circuit matching a high-spec display panel in accordance with an embodiment of the present application.

FIG. 1*c* is a schematic structural diagram of a low-spec timing control circuit matching a high-spec display panel in accordance with an embodiment of the present application. To facilitate understanding please also refer to FIG. 1*a*. The calculation specifications processed by the timing control circuit should match with or be higher than the display resolution of the display panel. For example, the display resolution of the display panel is 8K4K, it should be equipped with a timing control circuit with a screen processing capability of at least 8K4K. However, the development cost of related chips and integrated circuits (ICs) for high-resolution timing control circuits are relatively high. Therefore, two 4K2K timing control circuits are often used to design related alternative circuits, that is, using two 4K2K timing control circuits (101*a*, 101*b*) to convert 4K2K image control signals into 4K4K image control signals through data processing, and then transmit them to the first drive circuit 104, respectively. The first drive circuit 104 obtains the image control signal provided by the timing control circuit (101*a*, 101*b*) according to the obtained image control signal, or through two sets of data circuits (104*a*, 104*b*) separately. Controlling the left half of the screen and the right half of the screen of the display area 106 through the two sets of data lines (107*a*, 107*b*), to achieve 8K4K display. However, this requires the timing control circuit (101*a*, 101*b*) to have a function of data expansion, that is, to limit the specifications and components of the timing control circuit.

Figure 2A:
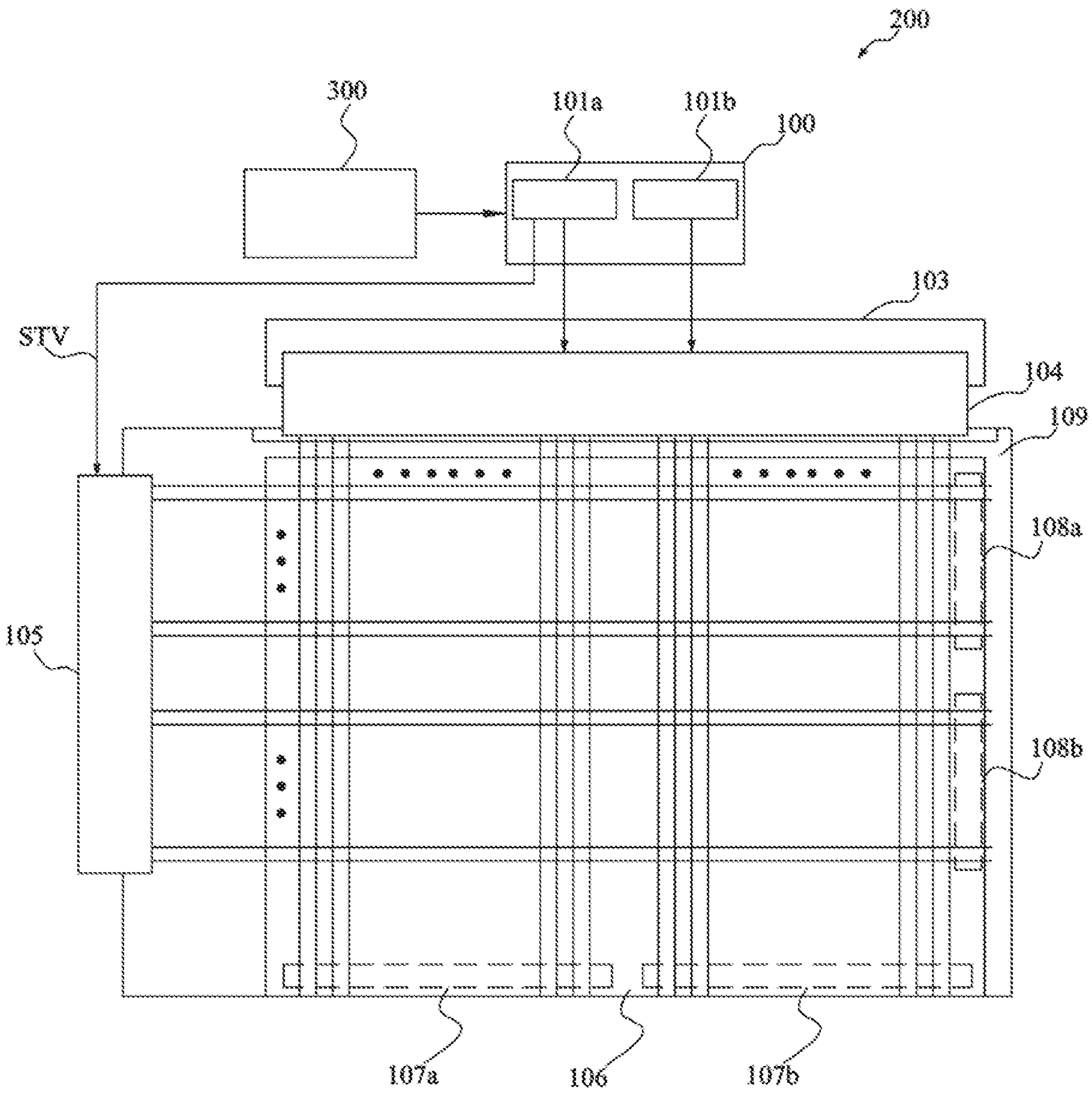
FIG. 2*a* is a schematic structural diagram of a display device in accordance with an embodiment of the present application.

FIG. 2*a* is a schematic structural diagram of a display device in accordance with an embodiment of the present application.

Please refer to FIG. 2*a*. In an embodiment of the present application, a display device 200 includes:

a display panel having a display area 106 and a peripheral wiring area 109, where the display area is provided with a plurality of scanning lines 108, a plurality of data lines 107, a plurality of active switches T and a plurality of pixels P, where the plurality of pixels P are coupled to the plurality of active switches T, respectively, and the plurality of active switches T are electrically coupled between the plurality of scanning lines 108 and the plurality of data lines 107, respectively;

the first drive circuit 104 which is configured to be connected with a plurality of data lines 107, where the plurality of data lines 107 are divided into a plurality of data line groups, and the plurality of data line groups include a first data line group 107*a* and a second data line group 107*b;* the second drive circuit 105 which is configured to be connected with a plurality of scanning lines 108, and the plurality of scanning lines 108 are divided into a plurality of scanning line groups;

the plurality of timing control circuits 101 which is configured to be connected with the first drive circuit 104, and the plurality of timing control circuits 101 include a first timing control circuit 101*a* and a second timing control circuit 101*b;* a signal transmission circuit 300 which divides screen data into a plurality of display data according to the display position, and transmits the plurality of display data to the corresponding plurality of timing control circuits, respectively;

in which, the first timing control circuit 101*a* is connected with the second drive circuit 105, the first timing control circuit 101 is configured to provides a plurality of gate activation signals which is corresponding to a plurality of scanning line groups, and the second drive circuit 105 controls scans of the plurality of scanning line groups according to the plurality of gate activation signals;

the first timing control circuit 101*a* and the second timing control circuit 101*b* convert the plurality of display data into a plurality of data signals corresponded thereto, and send the plurality of data signals to the first drive circuit 104, there is one-to-one correspondence between the plurality of data signals and the plurality of data lines groups, and the first drive circuit 104 adjusts the potentials of the first data line group 107*a* and the second data line group 107*b* according to a plurality of data signals.

The display positions of the screen data corresponding to the plurality of display data are in one-to-one correspondence with the plurality of gate activation signals.

In an embodiment, the first drive circuit 104 may be, but is not limited to, a source drive circuit.

In an embodiment, the second drive circuit 105 may be, but is not limited to, a gate drive circuit.

In an embodiment, the plurality of display data includes a first display data and a second display data;

The signal transmission circuit transmits the first display data to the first timing control circuit 101*a* in segments according to the number of signal transmissions of the plurality of gate activation signals in one frame. For example, but not limited to, a total of two gate activation signal transmissions are performed in one frame, that is, the first display data is transmitted to the first timing control circuit 101*a* in two times. The signal transmission circuit transmits the second display data to the second timing control circuit 101*b* in segments according to the number of signal transmissions of the plurality of gate activation signals in one frame, for example, but not limited to, a total of two gate activation signal transmissions are performed in one frame, that is, the second display data is transmitted to the second timing control circuit 101*b* in two times.

In an embodiment, the first timing control circuit 101*a* generates the first data signal according to the first display data. The second timing control circuit generates a second data signal according to the second display data. The first drive circuit 104 controls the first data line group 107*a* according to the first data signal. The first drive circuit 104 controls the second data line group 107*b* according to the second data signal.

In an embodiment, the plurality of scanning line groups include a first scanning line group 108*a* and a second scanning line group 108*b*. The first timing control circuit 101*a* sequentially provides a first gate activation signal STV1 and a second gate activation signal STV2. The second drive circuit 105 controls the first scanning line group 108*a* according to the first gate activation signal STV1. The second drive circuit 105 controls the second scanning line group 108*b* according to the second gate activation signal STV.

In an embodiment, when the plurality of timing control circuits 101 send the first gate activation signal STV1, the screen data corresponding to the first scanning line group 108*a* at an image position is provided; and when the plurality of timing control circuits 101 send the second gate activation signal STV2, the screen data corresponding to the second scanning line group 108*b* at the image position is provided.

Figure 2B:
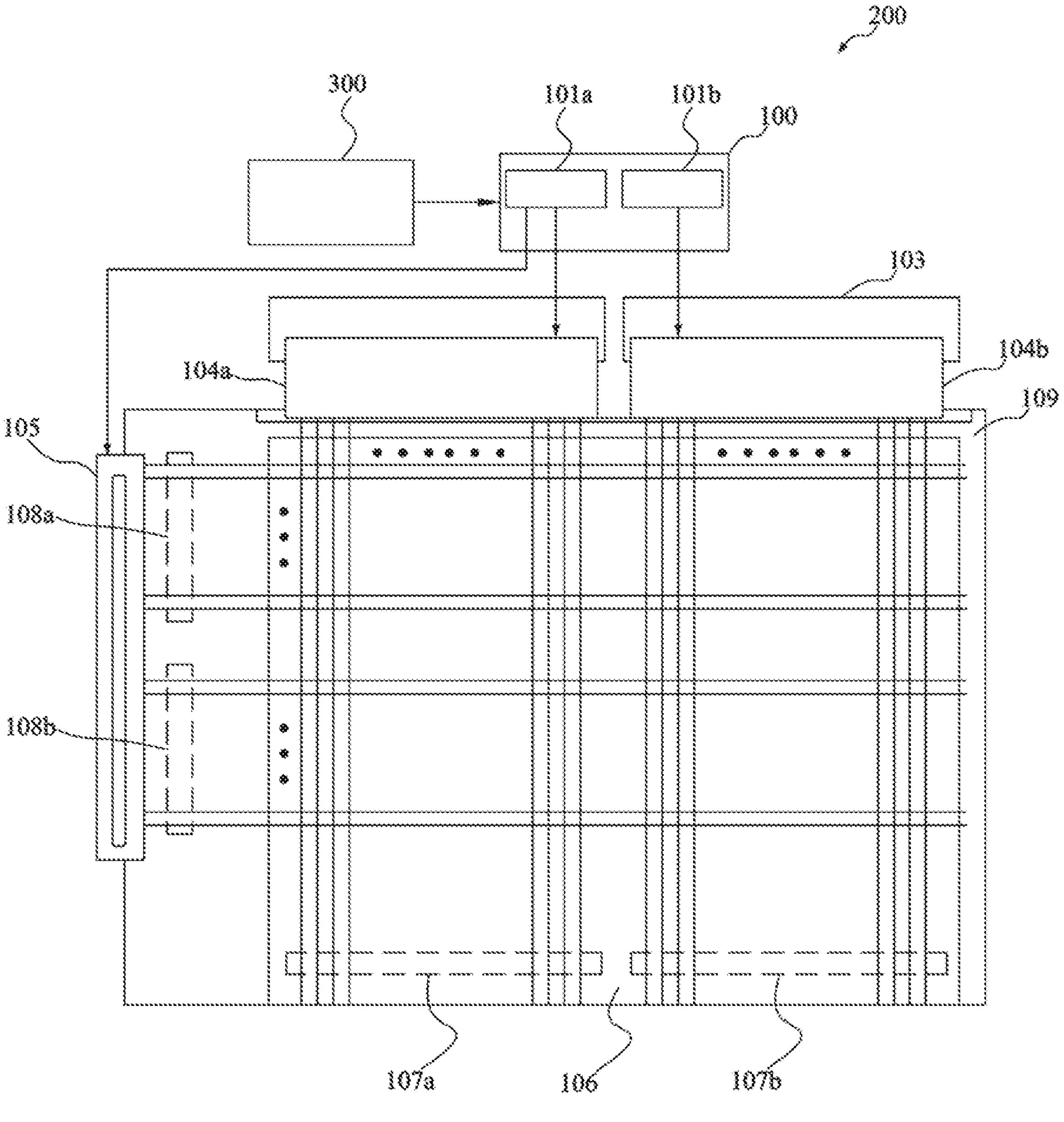
FIG. 2*b* is a schematic structural diagram of another display device in accordance with an embodiment of the present application.

FIG. 2*b* is a schematic structural diagram of another display device in accordance with an embodiment of the present application. To facilitate understanding please also refer to FIG. 1*a* to FIG. 2*b*.

In an embodiment, the second drive circuit 105 includes a first scan circuit 105*a* and a second scan circuit 105*b*. The first scan circuit 105*a* is configured to obtain the first gate activation signal STV1 to control the first scanning line group 108*a*. The second scan circuit 105*b* is configured to obtain the second gate activation signal STV2 to control the second scanning line group 108*b*.

Figure 2C:
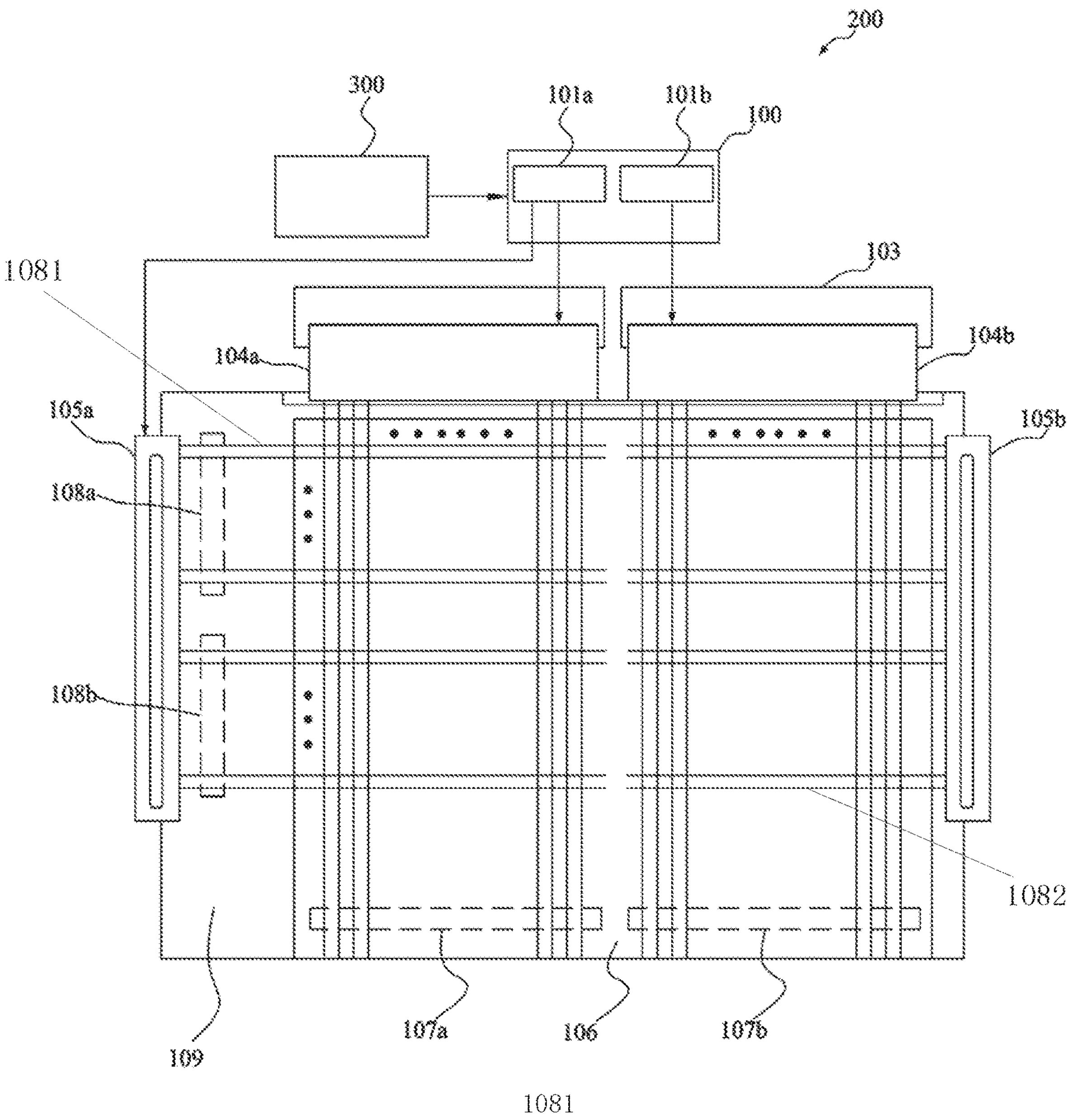
FIG. 2*c* is a schematic structural diagram of another display device in accordance with an embodiment of the present application.

FIG. 2*c* is a schematic structural diagram of another display device in accordance with an embodiment of the present application. To facilitate understanding please also refer to FIG. 1*a* to FIG. 2*b*.

In an embodiment, each scanning line 108 of the plurality of scanning lines is divided into a first line segment 1081 and a second line segment 1082;

the first line segment 1081 is connected with the first scan circuit 105*a*; the second line segment 1082 is connected with the second scan circuit 105*b;* the second drive circuit 105 includes a first scan circuit 105*a* and a second scan circuit 105*b;* the first scan circuit 105*a* is connected with the first line segment 1081 of the plurality of scanning lines 108;

the second scan circuit 105*b* is connected with the second line segment 1082 of the plurality of scanning lines 108;

the first timing control circuit 101*a* sequentially provides the first gate activation signal STV1 and the second gate activation signal STV2 to the first scan circuit 105*a*, where the first scan circuit 105*a* controls the first line segment 1081 of the first scanning line group 108*a* according to the first gate activation signal STV1, and controls the first line segment 1081 of the second scanning line group 108*b* according to the second gate activation signal STV2;

the second timing control circuit 101*b* sequentially provides the first gate activation signal STV1 and the second gate activation signal STV2 to the second scan circuit 105*b*, where the second scan circuit 105*b* controls the second line segment 1082 of the first scanning line group 108*a* according to the first gate activation signal STV1, and controls the second line segment 1082 of the second scanning line group 108*b* according to the second gate activation signal STV2.

As shown in FIGS. 2*b* and 2*c*, in an embodiment, the first drive circuit 104 includes a first data circuit 104*a* and a second data circuit 104*b*. The first timing control circuit 101*a* is connected with the first data circuit 104*a*, and the second timing control circuit 101*b* is connected with the second data circuit 104*b*.

The plurality of display data includes a first display data and a second display data. The signal transmission circuit transmits the first display data to the first timing control circuit 101*a* in segments according to the number of signal transmissions of the plurality of gate activation signals in one frame. The signal transmission circuit transmits the second display data to the second timing control circuit 101*b* in segments according to the number of signal transmissions of the plurality of gate activation signals in one frame. The first timing control circuit 101*a* generates a first data signal according to the first display data, and the second timing control circuit 101*b* generates a second data signal according to the second display data. The first data signal is transmitted to the first data circuit 104*a*, so that the first data circuit 104*a* controls the first data line group 107*a*; the second data signal is transmitted to the second data circuit 104*b*, so that the second data circuit 104*b* controls the second data line group 107*b*.

In an embodiment, the number of columns of the screen resolution of the display area is n times the number of columns of the screen resolution of the screen data processed by each timing control circuit, and the number of the plurality of timing control circuits is n.

The number of rows of the screen resolution of the display area is m times the number of rows of the screen resolution of the screen data processed by each timing control circuit, and the number of the plurality of gate activation signals is m; where n and m are positive integers.

In an embodiment, a display device includes:

the display panel having a display area 106 and a peripheral wiring area 109, where the display area is provided with a plurality of scanning lines 108, a plurality of data lines 107, a plurality of active switches T and a plurality of pixels P, where the plurality of pixels P are coupled to the plurality of active switches T, respectively, and the plurality of active switches T are electrically coupled between the plurality of scanning lines 108 and the plurality of data lines 107, respectively, where the plurality of scanning lines are divided into a first scanning line group and a second scanning line group, and the plurality of data lines are divided into a first data line group 107*a* and a second data line group 107*b;* the first drive circuit 104 which includes a first data circuit and a second data circuit, the first data circuit is connected with the first scanning line group, and the second data circuit is connected with the second scanning line group;

the second drive circuit 105 which includes a first scan circuit and a second scan circuit, each scanning line is divided into a first line segment and a second line segment, where the first scan circuit is connected with the first line segment of the plurality of scanning lines, and the second scan circuit is connected with the second line segment of the plurality of scanning lines;

the first timing control circuit 101*a* is connected with the first data circuit and the first scan circuit;

the second timing control circuit 101*b* is connected with the second data circuit and the second scan circuit;

the signal transmission circuit 300 divides the screen data into a plurality of display data according to the display position, and transmits the corresponding first timing control circuit and the second timing control circuit respectively;

in which, the first timing control circuit 101*a* and the second timing control circuit 101*b* convert the received plurality of display data into a plurality of data signals corresponded thereto, and send the plurality of data signals to the first drive circuit 104, and the plurality of data signals are in one-to-one correspondence with the plurality of data line groups, and the first drive circuit 104 controls the potentials of the plurality of data line groups respectively according to the plurality of data signals;

the first timing control circuit sequentially provides the first gate activation signal and the second gate activation signal to the first scan circuit, where the first scan circuit controls the first line segment of the first scanning line group according to the first gate activation signal, and controls the first line segment of the second scanning line group according to the second gate activation signal;

the second timing control circuit sequentially provides the first gate activation signal and the second gate activation signal to the second scan circuit, where the second scan circuit controls the second line segment of the first scanning line group according to the first gate activation signal, and controls the second line segment of the second scanning line group according to the second gate activation signal;

the signal frequency of the first gate activation signal and the second gate activation signal is 60 Hz;

the plurality of display data includes a first display data and a second display data;

the signal transmission circuit transmits the first display data to the first timing control circuit in segments according to the number of signal transmission of the plurality of gate activation signals in one frame;

the signal transmission circuit transmits the second display data to the second timing control circuit in segments according to the number of signal transmission of the plurality of gate activation signals in one frame;

the display positions of the screen data corresponding to the plurality of display data are in one-to-one correspondence with the plurality of gate activation signals.

Figure 3:
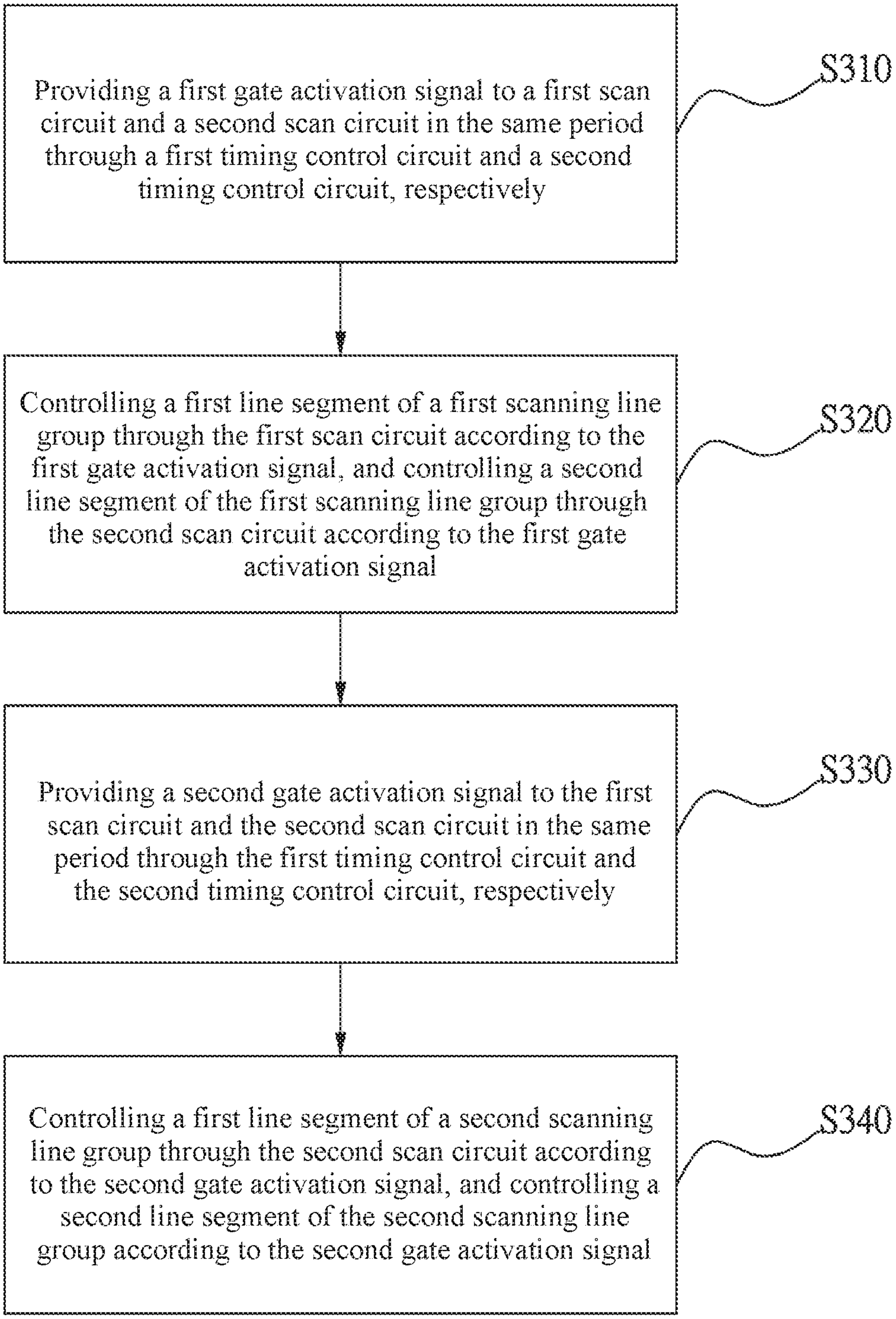
FIG. 3 is a schematic diagram of a driving method for a display device in accordance with an embodiment of the present application.

FIG. 3 is a schematic diagram of a driving method of a display device in accordance with an embodiment of the present application. To facilitate understanding please also refer to FIG. 1*a* to FIG. 2*c*.

As shown in FIG. 3, in an embodiment of the present application, a driving method for a display device includes:

Step S310, the first gate activation signal is provided to the first scan circuit 105*a* and the second scan circuit 105*b* in the same period through the first timing control circuit 101*a* and the second timing control circuit 101*b*, respectively.

Step S320, the first line segment 1081 of the first scanning line group 108*a* is controlled by the first scan circuit 105*a* according to the first gate activation signal, and the second line segment 1082 of the first scanning line group 108*a* is controlled by the second scan circuit 105*b* according to the first gate activation signal.

Step S330, the second gate activation signal is provided to the first scan circuit 105*a* and the second scan circuit 105*b* in the same period through the first timing control circuit 101*a* and the second timing control circuit 101*b*, respectively.

Step S340, the first line segment 1081 of the second scanning line group 108*b* is controlled by the first scan circuit 105*a* according to the second gate activation signal, and the second line segment 1082 of the second scanning line group 108*b* is controlled by the second scan circuit 105*b* according to the second gate activation signal.

In which, the first timing control circuit 101*a* sequentially provides the first gate activation signal and the second gate activation signal to the first scan circuit 105*a*, and the second timing control circuit 101*b* sequentially provides the first gate activation signal and the second gate activation signal to the second scan circuit 105*b*.

Please refer to FIG. 2*a*. In an embodiment of the present application, a display device 200 includes:

the display panel having a display area 106 and a peripheral wiring area 109, where the display area is provided with a plurality of scanning lines 108, a plurality of data lines 107, a plurality of active switches T and a plurality of pixels P, where the plurality of pixels P are coupled to the plurality of active switches T, respectively, and the plurality of active switches T are electrically coupled between the plurality of scanning lines 108 and the plurality of data lines 107, respectively;

the first drive circuit 104 which is connected with the plurality of data lines 107, the plurality of data lines 107 are divided into a plurality of data line groups, and the plurality of data line groups include a first data line group 107*a* and a second data line group 107*b;* the second drive circuit 105 which is connected to the plurality of scanning lines 108, and the plurality of scanning lines 108 are divided into a plurality of scanning line groups;

the plurality of timing control circuits 101 which are connected with the first drive circuit 104, and the plurality of timing control circuits 101 include a first timing control circuit 101*a* and a second timing control circuit 101*b;* the signal transmission circuit 300 which divides the screen data into a plurality of display data according to the display position, and transmits the plurality of display data to the corresponding plurality of timing control circuits respectively;

in which, the first timing control circuit 101*a* is connected with the second drive circuit 105, the first timing control circuit 101 sequentially provides a plurality of gate activation signals (STV), the plurality of gate activation signals correspond to a plurality of scanning line groups, and the second drive circuit 105 controls the scans of the plurality of scanning line groups according to plurality of gate activation signals;

the first timing control circuit 101*a* and the second timing control circuit 101*b* convert the plurality of display data into the corresponding plurality of data signals, and send the plurality of data signals to the first drive circuit 104, the plurality of data signals are in one-to-one correspondence with the plurality of data lines groups, where the first drive circuit 104 adjusts the potentials of the first data line group 107*a* and the second data line group 107*b* according to the plurality of data signals.

The display positions of the screen data corresponding to the plurality of display data are in one-to-one correspondence with the plurality of gate activation signals.

In an embodiment, the first drive circuit 104 may be, but is not limited to, a source drive circuit.

In an embodiment, the second drive circuit 105 may be, but is not limited to, a gate drive circuit.

In an embodiment, the plurality of display data includes a first display data and a second display data;

The signal transmission circuit transmits the first display data to the first timing control circuit 101*a* in segments according to the number of signal transmissions of the plurality of gate activation signals in one frame. For example, but not limited to, a total of two gate activation signal transmissions are performed in one frame, that is, the first display data is transmitted to the first timing control circuit 101*a* in two times; the signal transmission circuit transmits the second display data to the second timing control circuit 101*b* in segments according to the number of signal transmissions of the plurality of gate activation signals in one frame. For example, but not limited to, a total of two gate activation signal transmissions are performed in one frame, that is, transmits the second display data to the second timing control circuit 101*b* in two times.

In an embodiment, the first timing control circuit 101*a* generates a first data signal according to the first display data; the second timing control circuit generates a second data signal according to the second display data; the first drive circuit 104 controls the first data line group 107*a* according to the first data signal; the first drive circuit 104 controls the second data line group 107*b* according to the second data signal.

In an embodiment, the plurality of scanning line groups include a first scanning line group 108*a* and a second scanning line group 108*b*; the first timing control circuit 101*a* sequentially provides a first gate activation signal STV1 and a second gate activation signal STV2; the second drive circuit 105 controls the first scanning line group 108*a* according to the first gate activation signal STV1; the second drive circuit 105 controls the second scanning line group 108*b* according to the second gate activation signal STV2.

In an embodiment, when the plurality of timing control circuits 101 send the first gate activation signal STV1, the screen data corresponding to the first scanning line group 108*a* at am image position is provided; when the plurality of timing control circuits 101 send the second gate activation signal STV2, the screen data corresponding to the second scanning line group 108*b* at the image position is provided.

Figure 4:
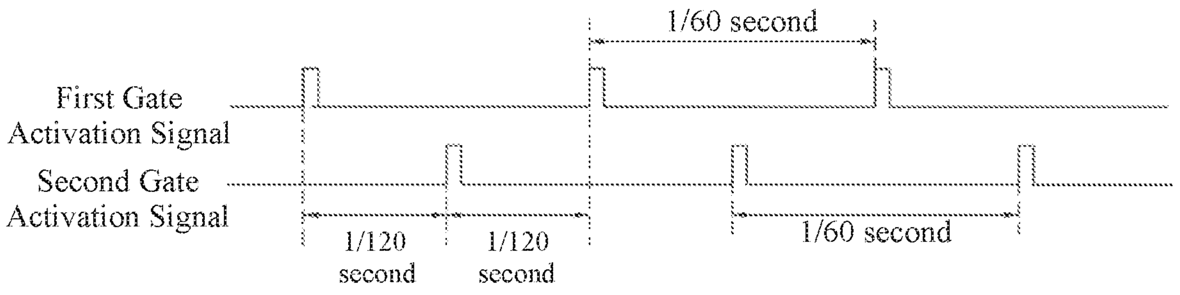
FIG. 4 is a schematic diagram of a gate activation signal of a display panel in accordance with an embodiment of the present application.
Figure 5:
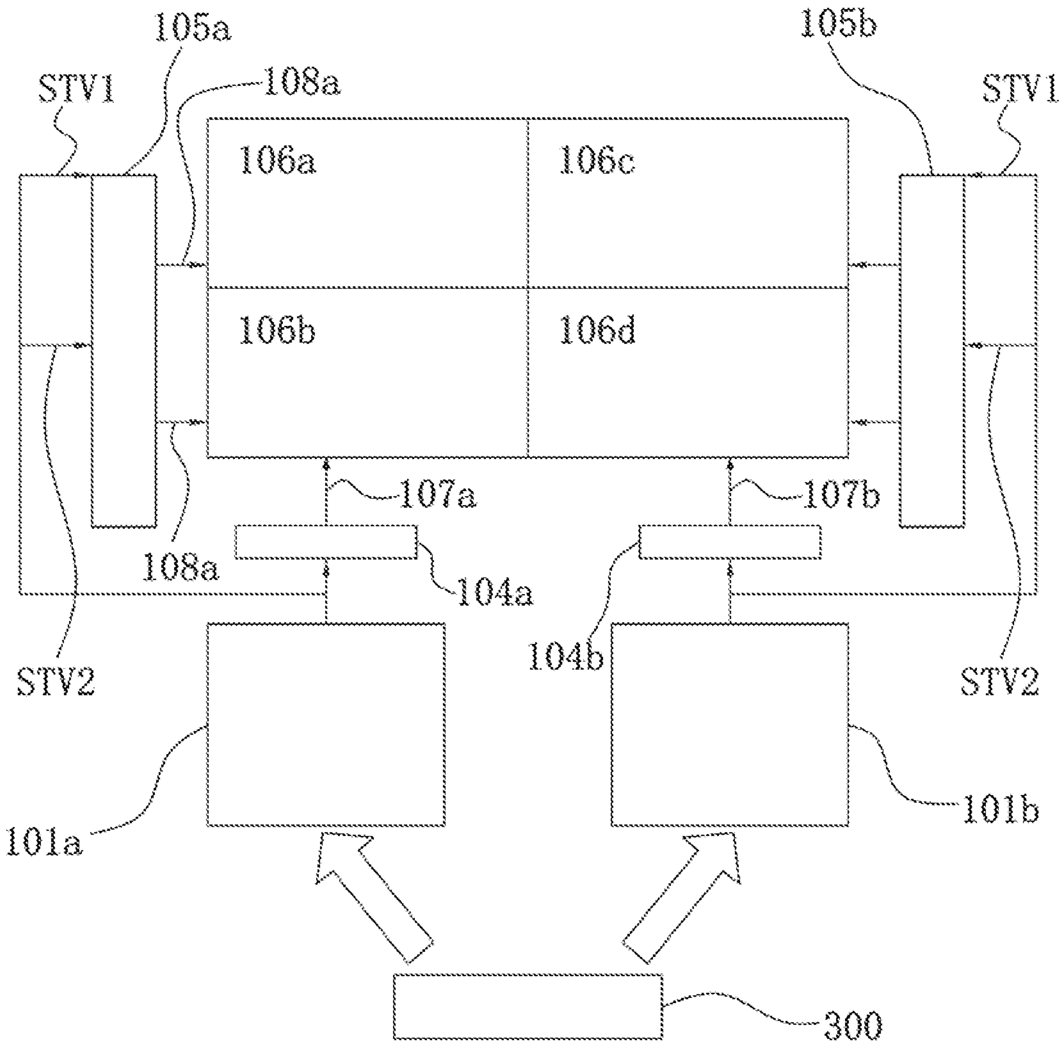
FIG. 5 is a schematic structural diagram of a display panel in accordance with an embodiment of the present application.

FIG. 4 is a schematic diagram of a gate activation signal of a display panel in accordance with an embodiment of the present application.

In an embodiment, the first timing control circuit 101*a* and/or the second timing control circuit 101*b* periodically and sequentially provide the plurality of gate activation signals STV.

In an embodiment, the first gate activation signal and the second gate activation signal have the same signal frequency. For example, but not limited to, the signal frequency of the first gate activation signal STV1 and the second gate activation signal STV2 is 60 Hz.

In an embodiment, the alternate signal frequency of the first gate activation signal STV1 and the second gate activation signal STV2 is 120 Hz.

In an embodiment, the number of columns of the screen resolution of the display area 106 is n times the number of columns of the screen resolution of the screen data processed by each timing control circuit 101, and the number of the plurality of timing control circuits 101 is n; the number of rows of the screen resolution of the display area 106 is m times the number of rows of the screen resolution of the screen data processed by each timing control circuit 101, and the number of the plurality of gate activation signals STV is m; where n and m are positive integers. For example, but not limited to, the number of columns of the screen resolution of the display area 106 is 8k, and the number of columns of the screen resolution of the screen data processed by each timing control circuit 101 is 4k, and the umber of the plurality of timing control circuits 101 is 2; the number of rows of the screen resolution of the display area 106 is 4k, the number of rows of the screen resolution of the screen data processed by each timing control circuit 101 is 2k for, and the umber of the plurality of gate activation signals STV is 2.

In an embodiment of the present application, the signal transmission circuit 300 divides a screen data into left-screen data and right-screen data, and transmits them to the first timing control circuit 101*a* and the second timing control circuit 101*b*, respectively. The signal transmission circuit 300 transmits the left-screen data to the first timing control circuit 101*a* in two times, one for the upper left-screen data and the other for the lower left-screen data. The first timing control circuit 101*a*, upon obtaining the upper left-screen data, sends the first gate activation signal STV1 to the first scan circuit 105*a*, and provides the upper left-screen data to the first data circuit 104*a* to perform a screen rendering of the upper left screen 106*a*. The first timing control circuit 101*a*, upon obtaining the bottom left-screen data, sends the second gate activation signal STV2 to the first scan circuit 105*a*, and provides the bottom left-screen data to the first data circuit 104*a* to perform the screen rendering of the bottom left screen 106*b*. Similarly, the signal transmission circuit 300 transmits the right-screen data to the second timing control circuit 101*b* in two times, one for the upper right-screen data, and the other for the lower right-screen data. The second timing control circuit 101*b* upon obtaining the upper right-screen data, sends the first gate activation signal STV1 to the second scan circuit 105*b*, and provides the upper right-screen data to the second data circuit 104*b* to perform the screen rendering of the upper right screen 106*c*.

The second timing control circuit 101*b* upon obtaining the bottom right-screen data, sends a second gate activation signal STV2 to the second scan circuit 105*b*, and provides the bottom right-screen data to the second data circuit 104*b* to perform the screen rendering of the bottom right screen screen 106*d*.

The first timing control circuit 101*a* and the second timing control circuit 101*b* synchronously transmit the first gate activation signal STV1 and the second gate activation signal STV2; and the first timing control circuit 101*a* and the second timing control circuit 101*b* in response to the previous frame (after STV1 trigger) synchronously processes the upper screen data of the same screen, and synchronously processes the lower screen data of the same screen at the next frame (after STV2 trigger).

In an embodiment, the first gate activation signal and the second gate activation signal have the same signal frequency.

In an embodiment, the driving method also includes dividing the screen data into a plurality of display data according to the display position through the signal transmission circuit, and the plurality of display data are respectively transmitted to the corresponding first timing control circuit or the second timing control circuit, where the first timing control circuit is connected with the second drive circuit, and the second drive circuit is configured to be connected with the scanning line.

In an embodiment, the driving method also includes: transmitting a plurality of data signals to a first drive circuit through the first timing control circuit and the second timing control circuit according to the obtained display data, respectively, where the first drive circuit is configured to be connected with data lines. The data lines is divided into a first data line group and a second data line group, and the first drive circuit controls the potentials of the first data line group and the second data line group respectively according to the plurality of data signals.

In an embodiment, the screen data includes a first display data and a second display data; the signal transmission circuit transmits the first display data to the first timing control circuit in segments according to the number of signal transmissions of the first gate activation signal in one frame; and the signal transmission circuit transmits the second display data to the second timing control circuit in segments according to the number of signal transmissions of the second gate activation signal in one frame.

In an embodiment, the first timing control circuit generates a first data signal according to the first display data; the second timing control circuit generates a second data signal according to the second display data; the first drive circuit controls the first data line group according to the first data signal; and the first drive circuit controls the second data line group according to the second data signal.

In an embodiment, when the first timing control circuit and/or the second timing control circuit send/sends the first gate activation signal, providing the screen data corresponds to the first scanning line group at an image position; and when the first timing control circuit and/or the second timing control circuit upon send/sends the second gate activation signal, providing the screen data corresponding to the second scanning line group at the image position.

In the present application, the division of labor for screen data transmission and the alternate switching control of scanning lines through the plurality of timing control circuits can better achieve the benefits of low-spec timing components controlling high-spec display panels. Since there is no need to adjust the manufacturing process significantly, the original process requirements and product cost can be maintained.

In some embodiments, the display panel described in the present application may be, for example, but not limited to, a liquid crystal display panel, and it may also be an organic light-emitting diode (OLED) display panel, and a white light-emitting diode (W-OLED) display panel, a Quantum Dot Light Emitting Diodes (QLED) display panels, a plasma display panel, a curved display panel or other types of display panels.

The above disclosures are merely optional embodiments of the present application, and are not intended to limit the present application. Any modification, equivalent replacement and improvement made within the spirit and principle of the present application shall be included by the protection scope of the present application.

What is claimed is:

1. A display device, comprising:

a display panel comprising a display area and a peripheral wiring area, wherein the display area comprises a plurality of scanning lines, a plurality of data lines, a plurality of active switches, and a plurality of pixels, wherein the plurality of pixels are coupled to the plurality of active switches, respectively, and the plurality of active switches are electrically coupled between the plurality of scanning lines and the plurality of data lines, respectively;

a first drive circuit, wherein the first drive circuit is connected to the plurality of data lines, and the plurality of data lines comprise a first data line group and a second data line group;

a second drive circuit, wherein the second drive circuit is connected to the plurality of scanning lines, and the plurality of scanning lines comprise a plurality of scanning line groups;

a plurality of timing control circuits, wherein the plurality of timing control circuits are connected to the first drive circuit, and the plurality of timing control circuits comprises a first timing control circuit and a second timing control circuit;

a signal transmission circuit, wherein the signal transmission circuit is configured to divide a screen data into a plurality of display data according to display positions, and transmit the plurality of display data to the plurality of timing control circuits corresponding to the plurality of display data, respectively;

wherein the first timing control circuit is connected to the second drive circuit, the first timing control circuit is configured to provide a plurality of gate activation signals, the plurality of gate activation signals correspond to the plurality of scanning line groups, and the second drive circuit is configured to control scans of the plurality of scanning line groups according to the plurality of gate activation signals;

wherein the first timing control circuit and the second timing control circuit are configured to convert the plurality of display data into a plurality of data signals corresponding to the plurality of display data, and send the plurality of data signals to the first drive circuit; the first drive circuit is configured to adjust potentials of the first data line group and the second data line group according to the plurality of data signals;

wherein the screen data comprises a first display data and a second display data;

the signal transmission circuit is configured to transmit the first display data to the first timing control circuit in segments according to a number of signal transmissions of the plurality of gate activation signals in one frame; and the signal transmission circuit is configured to transmit the second display data to the second timing control circuit in segments according to the number of signal transmissions of the plurality of gate activation signals in one frame.

2. The display device according to claim 1, wherein the first drive circuit is a source drive circuit.

3. The display device according to claim 1, wherein the second drive circuit is a gate drive circuit.

4. The display device according to claim 1, wherein the first timing control circuit is configured to generate a first data signal according to the first display data;

the second timing control circuit is configured to generate a second data signal according to the second display data;

the first drive circuit is configured to control the first data line group according to the first data signal; and the first drive circuit is configured to control the second data line group according to the second data signal.

5. The display device according to claim 1, wherein the plurality of scanning line groups comprise a first scanning line group and a second scanning line group;

the first timing control circuit is configured to sequentially provide a first gate activation signal and a second gate activation signal;

the second drive circuit is configured to control the first scanning line group according to the first gate activation signal; and the second drive circuit is configured to control the second scanning line group according to the second gate activation signal.

6. The display device according to claim 5, wherein when the plurality of timing control circuits send the first gate activation signal, a first screen data corresponding to the first scanning line group at an image position is provided; and when the plurality of timing control circuits send the second gate activation signal, a second screen data corresponding to the second scanning line group at the image position is provided.

7. The display device according to claim 5, wherein the second drive circuit comprises a first scan circuit and a second scan circuit;

the first scan circuit is configured to obtain the first gate activation signal to control the first scanning line group; and the second scan circuit is configured to obtain the second gate activation signal to control the second scanning line group.

8. The display device according to claim 5, wherein each scanning line of the plurality of scanning lines comprises a first line segment and a second line segment, and the second drive circuit comprises a first scan circuit and a second scan circuit, wherein;

the first line segment is connected to the first scan circuit;

the second line segment is connected to the second scan circuit;

the first timing control circuit is configured to sequentially provide the first gate activation signal and the second gate activation signal to the first scan circuit, and the first scan circuit is configured to control a first line segment of the first scanning line group according to the first gate activation signal and to control a first line segment of the second scanning line group according to the second gate activation signal; and the second timing control circuit is configured to sequentially provide the first gate activation signal and the second gate activation signal to the second scan circuit, and the second scan circuit is configured to control a second line segment of the first scanning line group according to the first gate activation signal and to control a second line segment of the second scanning line group according to the second gate activation signal.

9. The display device according to claim 1, wherein the first drive circuit comprises a first data circuit and a second data circuit, and the first timing control circuit is connected to the first data circuit, and the second timing control circuit is connected to the second data circuit.

10. The display device according to claim 9, wherein the screen data comprises a first display data and a second display data;

the signal transmission circuit is configured to transmit the first display data to the first timing control circuit in segments according to a number of signal transmissions of the plurality of gate activation signals in one frame;

the signal transmission circuit is configured to transmit the second display data to the second timing control circuit in segments according to the number of the signal transmissions of the plurality of gate activation signals in one frame;

the first timing control circuit is configured to generate a first data signal according to the first display data;

the second timing control circuit is configured to generate a second data signal according to the second display data;

the first data signal is transmitted to the first data circuit, and the first data circuit controls the first data line group; and the second data signal is transmitted to the second data circuit, and the second data circuit controls the second data line group.

11. The display device according to claim 1, wherein a number of columns of a screen resolution of the display area is n times a number of columns of a screen resolution of the screen data processed by each timing control circuit of the plurality of timing control circuits, and a number of the plurality of timing control circuits is n; and a number of rows of the screen resolution of the display area is m times a number of rows of the screen resolution of the screen data processed by the each timing control circuit, and a number of the plurality of gate activation signals is m; where n, m are positive integers.

12. A display device, comprising:

a display panel, comprising a display area and a peripheral wiring area, wherein the display area comprises a plurality of scanning lines, a plurality of data lines, a plurality of active switches, and a plurality of pixels, wherein the plurality of pixels are coupled to the plurality of active switches, respectively;

the plurality of active switches are electrically coupled between the plurality of scanning lines and the plurality of data lines, respectively;

the plurality of scanning lines comprises a first scanning line group and a second scanning line group, and the plurality of data lines comprises a first data line group and a second data line group;

a first drive circuit, comprising a first data circuit and a second data circuit, wherein the first data circuit is connected to the first scanning line group, and the second data circuit is connected to the second scanning line group;

a second drive circuit, comprising a first scan circuit and a second scan circuit, wherein each scanning line of the plurality of scanning lines comprises a first line segment and a second line segment, wherein the first scan circuit is connected to the first line segment of the each scanning line, and the second scan circuit is connected to the second line segment of the each scanning line;

a first timing control circuit, wherein the first timing control circuit is connected to the first data circuit and the first scan circuit;

a second timing control circuit, wherein the second timing control circuit is connected to the second data circuit and the second scan circuit; and a signal transmission circuit, wherein the signal transmission circuit is configured to divide a screen data into a plurality of display data according to display positions, and transmit the plurality of display data to the first timing control circuit corresponding to the plurality of display data and the second timing control circuit corresponding to the plurality of display data, respectively;

wherein the first timing control circuit and the second timing control circuit are configured to convert the plurality of display data into a plurality of data signals corresponding to the plurality of display data, and send the plurality of data signals to the first drive circuit; the plurality of data signals are in one-to-one correspondence with a plurality of data line groups, and the first drive circuit is configured to control potentials of the plurality of data line groups according to the plurality of data signals, respectively;

the first timing control circuit is configured to sequentially provide a first gate activation signal and a second gate activation signal to the first scan circuit, wherein the first scan circuit is configured to control a first line segment of the first scanning line group according to the first gate activation signal, and control a first line segment of the second scanning line group according to the second gate activation signal;

the second timing control circuit is configured to sequentially provide the first gate activation signal and the second gate activation signal to the second scan circuit, wherein the second scan circuit is configured to control a second line segment of the first scanning line group according to the first gate activation signal, and to control a second line segment of the second scanning line group according to the second gate activation signal;

signal frequencies of the first gate activation signal and the second gate activation signal are 60 Hz;

the plurality of display data comprises a first display data and a second display data;

the signal transmission circuit is configured to transmit the first display data to the first timing control circuit in segments according to a number of signal transmissions of the gate activation signal in one frame;

the signal transmission circuit is configured to transmit the second display data to the second timing control circuit in segments according to the number of the signal transmissions of the gate activation signal in one frame; and display positions of the screen data corresponding to the plurality of display data correspond to a plurality of gate activation signals, respectively.

13. A driving method of a display device, comprising:

providing a first gate activation signal to a first scan circuit and a second scan circuit in a same period through a first timing control circuit and a second timing control circuit, respectively;

controlling a first line segment of a first scanning line group through the first scan circuit according to the first gate activation signal, and controlling a second line segment of the first scanning line group through the second scan circuit according to the first gate activation signal;

providing a second gate activation signal to the first scan circuit and the second scan circuit in the same period through the first timing control circuit and the second timing control circuit, respectively; and controlling a first line segment of a second scanning line group through the second scan circuit according to the second gate activation signal, and controlling a second line segment of the second scanning line group through the second scan circuit according to the second gate activation signal;

dividing a screen data into a plurality of display data according to display positions through a signal transmission circuit, and transmitting the plurality of display data to the first timing control circuit corresponding to the plurality of display data or the second timing control circuit corresponding to the plurality of display data, respectively;

transmitting a plurality of data signals to a first drive circuit through the first timing control circuit and the second timing control circuit respectively according to the plurality of display data;

wherein the first timing control circuit is configured to sequentially provide the first gate activation signal and the second gate activation signal to the first scan circuit, and the second timing control circuit is configured to sequentially provide the first gate activation signal and the second gate activation signal to the second scan circuit;

wherein the first timing control circuit is connected to a second drive circuit, and the second drive circuit is connected-to scanning lines;

wherein the first drive circuit is connected to data lines, and the data lines comprises a first data line group and a second data line group, and the first drive circuit controls potentials of the first data line group and the second data line group respectively according to the plurality of data signals; and wherein the screen data comprises a first display data and a second display data;

the signal transmission circuit is configured to transmit the first display data to the first timing control circuit in segments according to a number of signal transmissions of the first gate activation signal in one frame; and the signal transmission circuit is configured to transmit the second display data to the second timing control circuit in segments according to a number of the signal transmissions of the second gate activation signal in one frame.

14. The driving method according to claim 13, wherein the first gate activation signal and the second gate activation signal have a same signal frequency.

15. The driving method according to claim 13, wherein the first timing control circuit is configured to generate a first data signal according to the first display data;

the second timing control circuit is configured to generate a second data signal according to the second display data;

the first drive circuit is configured to control the first data line group according to the first data signal; and the first drive circuit is configured to control the second data line group according to the second data signal.

16. The driving method according to claim 13, wherein when the first timing control circuit and/or the second timing control circuit send the first gate activation signal, providing a first screen data corresponding to the first scanning line group at an image position; and when the first timing control circuit and/or the second timing control circuit send the second gate activation signal, providing a second screen data corresponding to the second scanning line group at the image position.

* * * * *